United States Patent [19]

Raymond et al.

[11] Patent Number: 5,183,010
[45] Date of Patent: Feb. 2, 1993

[54] ADDITIVE FOR BINDING LIQUID WASTE

[75] Inventors: Marvin L. Raymond; Dana G. Barrett, both of Cape Girardeau; Phillip B. Greene, Sikeston, all of Mo.

[73] Assignee: Golden Cat Corporation, South Bend, Ind.

[21] Appl. No.: 826,800

[22] Filed: Jan. 28, 1992

[51] Int. Cl.$^5$ .............................................. A01K 1/015
[52] U.S. Cl. ..................................... 119/172; 119/173
[58] Field of Search ......................... 119/171, 172, 173

[56] References Cited

U.S. PATENT DOCUMENTS

| | | | |
|---|---|---|---|
| 3,921,581 | 11/1975 | Brewer | 119/1 |
| 4,560,527 | 12/1985 | Harke et al. | 119/172 |
| 4,621,011 | 11/1986 | Fleischer et al. | 119/172 |
| 4,641,605 | 2/1987 | Gordon | 119/173 |
| 4,657,881 | 4/1987 | Crampton et al. | 20/12 |
| 4,676,196 | 6/1987 | Lojek et al. | 119/171 |
| 4,844,010 | 7/1989 | Ducharme et al. | 119/173 |
| 5,014,650 | 5/1991 | Sowle et al. | 119/171 |
| 5,094,189 | 3/1992 | Aylen et al. | 119/173 |
| 5,094,190 | 3/1992 | Ratcliff et al. | 119/173 |

FOREIGN PATENT DOCUMENTS

| | | |
|---|---|---|
| 165820 | 12/1985 | European Pat. Off. |
| 3644826 | 7/1987 | Fed. Rep. of Germany |
| 3644826A | 7/1987 | Fed. Rep. of Germany |
| 63-102618 | 5/1988 | Japan |
| 1-191626 | 8/1989 | Japan |

Primary Examiner—John G. Weiss
Attorney, Agent, or Firm—Baker & Daniels

[57] ABSTRACT

A litter composition including a particulate liquid absorbent material and a particulate polymer having a hydroxyl group content sufficient to enable the litter composition to agglomerate into a mass upon contact with liquid waste to facilitate removal of the liquid waste from a container containing the litter composition. The litter composition further includes a boron compound to accelerate hardening of the mass.

28 Claims, No Drawings

ADDITIVE FOR BINDING LIQUID WASTE

BACKGROUND OF THE INVENTION

The present invention relates generally to compositions for absorbing liquid wastes in animal litters, and more particularly to a litter composition that agglomerates into a mass upon contact with a liquid.

Animal litter compositions, such as cat litter, are well known for collecting urine and feces of house-broken animals. Conventional litter compositions include absorbent materials such as clays, paper, wood chips, organic fiber, etc. When odors from the animal waste in the litter become objectionable, the fecal matter may be physically removed from the litter. However, in order to remove the odors caused by the urine, it has been necessary to discard the entire litter composition, including the unsoiled litter, and replace the litter box with fresh litter.

In order to reduce the inconvenience and expense of replacing the entire litter material, recent litter compositions have included substances which agglomerate or gel when wetted to form a mass, thereby permitting the soiled litter to be conveniently separated from the unsoiled litter. Such substances include swelling clays such as bentonite and other swelling montmorillonites which are disclosed, for example, in U.S. Pat. No. 5,000,115, issued to Hughes. The litter composition of Hughes preferably includes bentonite clay in an amount of at least 65% by weight of the total composition. Essentially, the bentonite clay agglomerates when wetted to permit physical removal of the wetted litter box absorbent material from the "unwetted" material. One problem with swelling clays is that they must be of a type that can be processed into animal litters. Thus, selective mining may be required in order to obtain a good quality of swelling clay, thereby raising the cost of the litter material. Furthermore, the ability of a swelling clay to solidify urine can be negatively affected by the electrolytes present in urine.

In addition to swelling clays, additives may be provided to conventional absorbent litter materials to agglomerate the animal urine into a removable mass. In U.S. Pat. No. 4,685,420, issued to Stuart, there is disclosed a litter box absorbent composition in which 0.01% to 5% by weight of the composition is a water-absorbing polyacrylate. The remainder of the litter composition is an inert solid substrate made of conventional litter box absorbent materials. The polyacrylates act to gel the soiled litter box absorbent material into a gelled product. The gelled absorbent material can then be physically removed from the litter box to reduce the generation of offensive odors and to avoid discarding the unsoiled portion of the absorbent material. A problem with these additives is that they are relatively expensive, thereby raising the cost of the litter material to unacceptable levels.

It is desired to provide an absorbent material which is cost effective yet also overcomes the problems associated with the above swelling clays and clumping additives.

SUMMARY OF THE INVENTION

The present invention provides a clumping additive for a liquid absorbent litter composition, wherein the additive may suitably comprise, consist of, or consist essentially of a particulate polymer having a hydroxyl group content sufficient to permit the litter composition to agglomerate or solidify into a mass upon contact with a liquid that is deposited in the litter composition, and an accelerator to accelerate hardness of the mass.

More particularly, the invention provides, in one form thereof, such a clumping additive in an amount up to about 20% by weight of the total litter composition. A preferred polymer is pregelatinized starch in an amount ranging from about 1% to about 10% by weight of the total litter composition, and most preferably at about 5%. A preferred boron compound is sodium tetraborate decahydrate (borax) in an amount ranging from about 1% to about 10% by weight of the total litter composition, and most preferably at about 5%.

An advantage of the absorbent compound of the present invention is that it permits any nonswelling or nonmineral absorbent such as those materials that have been used to make conventional litters, to bind liquid waste into a removable, solidified form, resulting in a cleaner and less odorous litter.

Another advantage of the absorbent composition of the present invention is that the absorbent material that is saturated with liquid waste quickly clumps into a stable mass for easy removal from the dry litter.

Yet another advantage of the absorbent composition of the present invention is that the composition is not negatively affected by the sodium present in liquid waste.

A further advantage of the absorbent composition of the present invention is that the binding additive can be preconditioned t reduce dust and prevent segregation of the binding additive from the absorbent particles.

The present invention provides, in one form thereof, a litter composition capable of agglomerating upon contact with a liquid that is deposited in the composition to facilitate removal of the liquid from a container containing the litter composition. The composition includes a particulate liquid absorbent material and a particulate polymer having a hydroxyl group content sufficient to enable the litter composition to agglomerate into a mass upon contact with a liquid. An accelerator is provided to accelerate hardening of the mass. The resulting mass is of sufficient cohesive strength to permit removal of the mass from the container.

The present invention provides, in one form thereof, a method of preparing a litter composition including a particulate liquid absorbent material. The method includes combining together under high pressure particulate starch and sodium borate to form a compacted material. The compacted material is then granulated to a predetermined particle size. The granulated material is then mixed together with the particulate absorbent material in an amount sufficient to enable the litter composition to agglomerate into a mass upon contact with a liquid, whereupon the mass may be removed from the container containing the litter composition.

DESCRIPTION OF THE PREFERRED EMBODIMENT

In accordance with a feature of the present invention, a litter composition is provided including a group of absorbent particles, a polymer binder system to solidify liquids such as blood, vomit, and particularly urine, and an accelerator to accelerate hardening of the solidified mass. The litter composition of the present invention can be used in litter boxes or cages of household pets such as cats, hamsters, gerbils, guinea pigs, etc. In addition, the litter composition may be useful for other pets such as rabbits and ferrets, as well as laboratory animals such as rats and monkeys.

The particulate absorbent material that composes the highest percentage by weight of the litter composition may be mineral absorbents such as clays, zeolites, silicates, etc. The clays may be swelling clays such as sodium montmorillonite or non-swelling clays, such as calcium montmorillonite. In addition, the absorbent material may be non-mineral absorbents, such as paper, wood chips, organic fiber, peanut hulls, alfalfa, bark, straw, sawdust, sand, etc. Preferably, the size of the absorbent particles ranges from about 6 mesh (3,360 microns) to about 200 mesh (74 microns). A most preferred particle size range is about 8 mesh (2380 microns) to about 50 mesh (297 microns).

In order to enable the litter composition to agglomerate into a mass upon contact a liquid substance, a binder is mixed with the litter composition, preferably in an amount ranging from about 1% to about 10% by weight of the litter composition. Generally, the binder includes a polymer having a hydroxyl group content sufficient to permit the litter composition to agglomerate into a mass upon contact with a liquid substance. It is believed that the hydroxyl group content of certain polymers is sufficient to absorb liquids and swell in such a manner to bind liquids. The polymer may be a polysaccharide, such as a starch or a natural gum, or may be synthetic such as polyvinyl alcohol. A preferred binder is a pregelatinized starch, and more preferably, a potato starch that has been pregelatinized and hydroxypropylated. Such a starch is commercially available from suppliers including A. E. Staley Mfg. Co. under the trade name STA-JEL 141. Preferably, the particle size of the binder range from about 30 mesh (500 microns) to about 200 mesh (74 microns).

The litter composition of the present invention further includes an accelerator such as a boron compound, and more particularly, sodium borate which acts as an accelerator to more quickly harden and stabilize the agglomerated mass. Sodium borate is meant to include the sodium metaborates and the sodium tetraborates. A most preferred accelerator is sodium tetraborate decahydrate (borax) which is commercially available from U.S. Borax Company. The accelerator is preferably present in an amount by weight equal to that of the binder. Although it is believed that the accelerator does not aid in the agglomeration process, the accelerator is believed to be necessary to accelerate the hardening of the agglomerated mass sufficiently to permit convenient removal of the mass from the remaining litter in a relatively short period of time after initial deposit of a liquid in the litter composition.

The absorbent particles, binder, and accelerator may be physically mixed together in a conventional manner. For example, appropriate amounts of each component may be added to a container which is then agitated for a short period of time, such as a minute. The binder and accelerator particles in the resulting litter composition are sufficiently dispersed among the absorbent particles to enable the litter composition to agglomerate upon contact with a liquid substance that is deposited in the litter composition.

In a preferred embodiment, the binder and accelerator are preconditioned before being mixed with the absorbent particles. In particular, the binder and accelerator are blended together, preferably in equal weight amounts, and then "densified" through compaction. In particular, the binder and accelerator are blended together in a conventional mixer, such as a rhythm blender or a vee blender, until a homogenous product is achieved. The mixture is then introduced into a roll compactor and compacted, at ambient temperature, at pressures up to 60,000 psi, and preferably at a pressure between 15,000 and 20,000 psi. The resulting product is in the form of a thin sheet which is then discharged into a granulator which particulates the material into the desired particle size. A screen separator insures that only the desired particle sizes are collected for use. Preferably, the particle or granule size ranges from about 6 mesh (3360 microns) to about 100 mesh (150 microns). A most preferred range is from about 8 mesh (2380 microns) to about 50 mesh (300 microns).

The preconditioning provides several potential advantages. First, the binder and accelerator are in intimate contact with one another, thereby increasing efficacy and reducing the amount of additive necessary to provide the desired agglomeration or clumping strength. Second, the preconditioning reduces potential dust in the final product by eliminating the addition of fine powders to the absorbent particles. Finally, the preconditioning reduces or eliminates any potential segregation of the additive from the absorbent particles because the additive is granulated to a size which generally equals the size of the absorbent particles.

The present invention may be better understood by reference to the following experiments. These experiments illustrate the advantages of a litter composition in accordance with the principles of the present invention.

EXPERIMENT 1

In Experiment 1, six different litter compositions were tested. For each litter composition tested, three individual tests were conducted for each of the times indicated below. In other words, each number in the table below is the average of three individual tests.

For illustrative purposes, the testing procedure for litter composition number 1 in Experiment 1 will now be explained. For this litter composition, four separate litter pans were used. Each pan was filled with the same litter composition, i.e. 92.9% non-swelling clay (calcium montmorillonite), 5% STA-JEL 14 starch, and 2.1% borax. These components were each mixed together in a conventional manner to provide a homogeneous litter mixture. Then 10 milliliters of 2% NaCl solution was added to the litter in three different locations in each pan, whereupon three clumps of litter formed in each pan. Sodium chloride solution is used because it has essentially the same electrolytic properties as animal urine. A clump may be defined as a solidified and removable mass that forms when a liquid is added to the litter. After 15 minutes, the three clumps were removed from the first litter pan as discrete entities, and the clump strength of each clump was tested.

To test clump strength, each clump was supported on a pair of longitudinal, spaced supports. Pressure was then applied to the top of the clump utilizing a force gauge commercially available from Chattillon Company. The force was applied to the clump at a position approximately halfway between the two supports such that an equal force was, in turn, applied to each support. The force on the clump was increased until a conspicuous break in the clump occurred, at which point the force on the gauge was measured. For these three clumps, the average force applied before a break in the clump occurred was about 0.6 pounds. The same tests were performed for the clumps formed in the litter pans for the specified times of 1, 4, and 24 hours. Then, the same test was repeated for litter box compositions 2-6.

In the table shown below, the results are in pounds of force necessary to break a clump. For the tests of Experiment the following specific components were used:
- non-swelling clay—calcium montmorillonite
- swelling clay—sodium montmorillonite
- high swelling clay—Wyoming Bentonite
- starch—STA-JEL 141 potato starch.

In addition, all percentages listed are weight percents of the litter composition.

TABLE 1

| Sample | Clump Strength Average | | | |
|---|---|---|---|---|
| | 15 min | 1 hr | 4 hr | 24 hr |
| 1) Non-swelling clay with 5% starch and 2.1% borax | 0.6 | 1.4 | 1.8 | 3.8 |
| 2) Non-swelling clay with 4% starch and 5% borax | 0.5 | 0.7 | 0.8 | 4.4 |
| 3) Non-swelling clay with 5% starch and 5% borax | 0.6 | 0.7 | 1.7 | 3.0 |
| 4) Non-swelling clay with 5% starch and 1.25% borax | 0.6 | 1.1 | 1.9 | 3.7 |
| 5) 50%/50% Blend of swelling and non-swelling clays (This sample contains no starch or borax) | 0.3 | 0.4 | 0.7 | 1.7 |
| 6) High Swelling clay | 0.4 | 0.5 | 1.1 | 4.3 |

As shown above, each of the combinations of starch and borax exhibited superior clumping properties over the high swelling clay litter and the 50/50 blend of swelling and non-swelling clay for the 15 minute and 1 hour tests. Superior results were also generally achieved for the 4 and 24 hour tests. Thus, the litter composition used in accordance with principles of the present invention forms masses or clumps having cohesive strengths that are superior to those of swelling clays, especially during the first several hours after a clump has formed.

EXPERIMENT 2

In Experiment 2, the clump strengths of litter compositions utilizing the preconditioned additives were tested, with the results illustrated below. The procedure followed was essentially the same as that described in Experiment 1, except that the additive was preconditioned before being mixed with the liquid absorbent material (non-swelling clay).

TABLE 2

| | Clump Strength Average | | | |
|---|---|---|---|---|
| | 15 min | 1 hr | 4 hr | 24 hr |
| 1) Non-swelling Clay with 5% Borax/5% Starch Preconditioned | 0.5 | 0.7 | 1.0 | 3.0 |
| 2) Non-swelling clay with 4% Borax/4% Starch Preconditioned | 0.5 | 0.5 | 0.9 | 2.6 |

The results of Table 2 illustrate that desirable clumping properties may be achieved by preconditioning the clumping additives in the manner indicated heretofore before mixing the additives with the liquid absorbent material.

It is appreciated by those skilled in the art that the animal litter composition of the present invention can include additional components such as odor absorbents, perfumes, colorants, disinfectants, antimicrobial agents, etc.

It will be appreciated that the foregoing is presented by way of illustration only, and not by way of any limitation, and that various alternatives and modifications may be made to the illustrated embodiment without departing from the spirit and scope of the invention.

What is claimed is:

1. A litter composition capable of agglomerating upon contact with a liquid that is deposited in the composition to facilitate removal of the liquid from a container containing the litter composition, comprising:
   a particulate liquid absorbent material;
   a particulate polymer having a hydroxyl group content sufficient to enable the composition to agglomerate into a mass upon contact with a liquid; and
   an accelerator in an amount sufficient to accelerate hardening of the mass;
   said mass being of sufficient cohesive strength to permit removal of said mass from the container.

2. The litter composition of claim 1, wherein said accelerator is a boron compound.

3. The litter composition of claim 1, wherein said polymer is a starch.

4. The litter composition of claim 3, wherein said starch is a pregelatinized potato starch.

5. The litter composition of claim 1, wherein said polymer is one of polyvinyl alcohol and a natural gum.

6. The litter composition of claim 1, wherein said boron compound is one of a sodium tetraborate and a sodium metaborate.

7. The litter composition of claim 1, wherein said polymer is present in the litter composition in an amount by weight equal to that of said accelerator.

8. The litter composition of claim 1, wherein said polymer is present in an amount ranging from about 1% to about 10% by weight of the litter composition.

9. The litter composition of claim 8, wherein said polymer is present in an amount of about 5% by weight of the litter composition.

10. The litter composition of claim 1, wherein said accelerator is present in an amount ranging from about 1% to 10% by weight of the litter composition.

11. The litter composition of claim 10, wherein said accelerator is present in an amount of about 5% by weight of the litter composition.

12. The litter composition of claim 1, wherein the particle size of said polymer ranges from about 30 mesh to about 200 mesh.

13. A litter composition capable of agglomerating upon contact with a liquid that is deposited in the composition to facilitate removal of the liquid from a container containing the litter composition, comprising:
   a particular liquid absorbent material;
   a particulate starch in an amount sufficient to enable the composition to agglomerate into a mass upon contact with a liquid; and
   a sodium borate compound in an amount sufficient to accelerate hardening of said mass;
   said mass being of sufficient cohesive strength to permit removal of said mass from the container.

14. The litter composition of claim 13, wherein said starch is present in the litter composition in an amount by weight equal to that of said sodium borate.

15. The litter composition of claim 13, wherein said starch is present in an amount ranging from about 1% to about 10% by weight of the litter composition.

16. The litter composition of claim 15, wherein said starch is present in an amount of about 5% by weight of the litter composition.

17. The litter composition of claim 13, wherein said sodium borate is present in an amount ranging from about 1% to 10% by weight of the litter composition.

18. The litter composition of claim 17, wherein said sodium borate is present in an amount of about 5% by weight of the litter composition.

19. The litter composition of claim 13, wherein the particle size of said starch ranges from about 30 mesh to about 200 mesh.

20. A method of preparing a litter composition including a particulate liquid absorbent material, the method comprising the steps of:
   combining together under high pressure a starch and a sodium borate compound to form a compacted material;
   granulating said compacted material to a predetermined particle size; and
   mixing said granulated material with the liquid absorbent material, said granulated material being present in an amount sufficient to cause the composition to agglomerate into a mass upon wetting for removal of said mass from a container containing the litter composition.

21. The method of claim 20, wherein said particle size ranges from about 6 mesh to about 100 mesh.

22. The method of claim 21, wherein said particles size ranges from about 8 mesh to about 50 mesh.

23. A litter composition capable of agglomerating upon contact with a liquid that is deposited in the composition to facilitate removal of the liquid from a container containing the litter composition, comprising:
   a particulate liquid absorbent material;
   a particulate polymer having a hydroxyl group content sufficient to enable the composition to agglomerate into a mass upon contact with a liquid; and
   an accelerator to accelerate hardening of the mass, said polymer and said accelerator being combined together to form a preconditioned clumping additive;
   said mass being of sufficient cohesive strength to permit removal of said mass from the container.

24. The litter composition of claim 23, wherein said additive has a particle size ranging from about 6 mesh to about 100 mesh.

25. The litter composition of claim 24, wherein said particle size ranges from about 8 mesh to about 50 mesh.

26. The litter composition capable of agglomerating upon contact with a liquid that is deposited in the composition to facilitate removal of the liquid from a container containing the litter composition, comprising:
   a particulate liquid absorbent material;
   a particulate starch in an amount sufficient to enable the composition to agglomerate into a mass upon contact with a liquid; and
   a sodium borate compound to accelerate hardening of said mass, said starch and said sodium borate compound being combined together to form a preconditioned clumping additive;
   said mass being of sufficient cohesive strength to permit removal of said mass from the container.

27. The litter composition of claim 26, wherein said additive has a particle size ranging from about 6 mesh to about 100 mesh.

28. The litter composition of claim 27, wherein said particle size ranges from about 8 mesh to about 50 mesh.

* * * * *